United States Patent [19]

Blanchard et al.

[11] Patent Number: 4,783,755

[45] Date of Patent: Nov. 8, 1988

[54] INTERVAL TIMER CIRCUIT

[75] Inventors: Clark E. Blanchard, Kentwood; Jon D. Lark, Grand Rapids, both of Mich.

[73] Assignee: Jet Electronics & Technology, Inc., Grand Rapids, Mich.

[21] Appl. No.: 828,318

[22] Filed: Feb. 11, 1986

[51] Int. Cl.[4] .............................................. G06F 15/20

[52] U.S. Cl. ............................... 364/569; 364/424.03; 364/551.01

[58] Field of Search ............... 364/424, 550, 551, 569, 364/488–491; 307/200 A

[56] References Cited

U.S. PATENT DOCUMENTS

| | | | |
|---|---|---|---|
| 3,057,155 | 10/1962 | Rizk | 318/359 |
| 3,470,691 | 10/1960 | Smith | 60/39.091 |
| 3,757,756 | 9/1973 | Owyoung et al. | 123/179 G |
| 3,986,055 | 10/1976 | Barzely | 307/271 |
| 4,215,412 | 7/1980 | Bernier et al. | 364/551 |
| 4,275,356 | 6/1981 | Aviander et al. | 307/597 |
| 4,466,074 | 8/1984 | Jindrick et al. | 364/569 |
| 4,575,803 | 3/1986 | Moore | 364/551 |

*Primary Examiner*—Gary Chin

*Attorney, Agent, or Firm*—Price, Heneveld, Cooper, DeWitt & Litton

[57] ABSTRACT

An interval timer circuit includes an RC circuit selectively coupled to a reference voltage source such that when power is removed, the capacitor discharges in a predictable manner to provide a time dependent but power supply independent voltage across the capacitor which can be employed to determine the downtime of electrical equipment or machinery.

20 Claims, 1 Drawing Sheet

FIG. 1
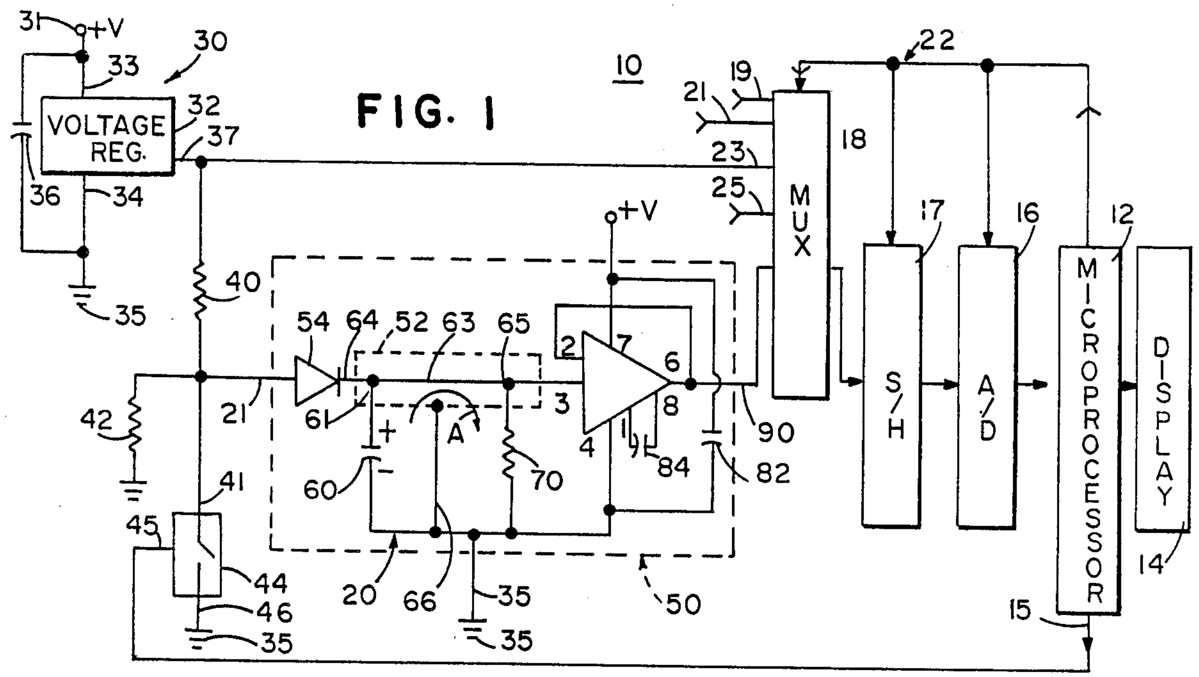
FIG. 2
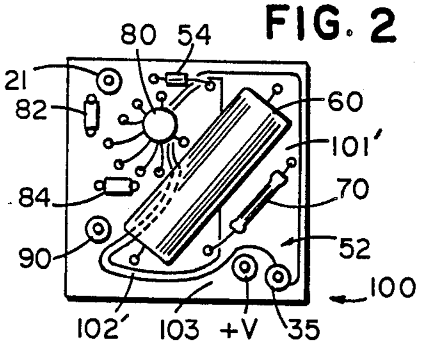
FIG. 3
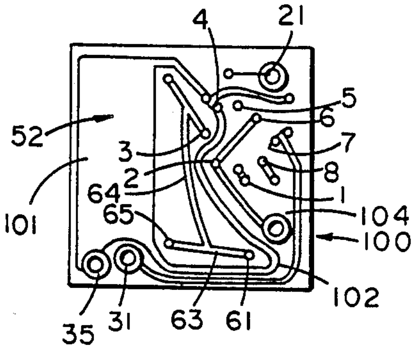
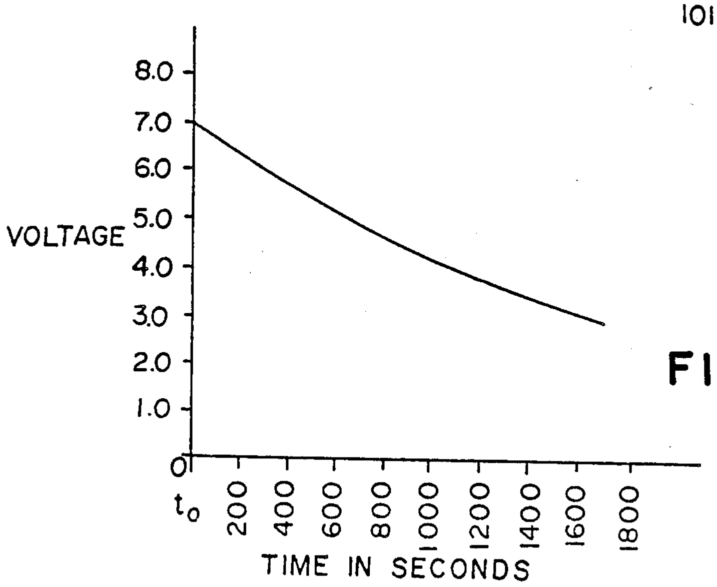
FIG. 4

INTERVAL TIMER CIRCUIT

BACKGROUND OF THE INVENTION

The present invention pertains to an electrical circuit, and particularly one for use in providing a time-related voltage when power is disconnected from an electrical system.

Most machinery or equipment is required to be de-energized for at least brief periods of time. In the field of gas turbine engines used for aircraft, for example, the downtime is a significant factor in the amount of thermal cyclic fatigue inasmuch as cooling and thermal creep take place during the downtime and engine wear is directly related, therefore, to the time period in which the engine is turned off.

As is well known, aircraft main battery supplies are typically meager and individual equipment batteries highly undesirable. Therefore, with the engine off and no charging current available, the electrical system of the aircraft is typically turned off. Thus, when the aircraft is parked and the engine is turned off, the instruments will also be depowered, thereby preventing the utilization of a powered clock for providing downtime information to an engine life monitor such as that disclosed in U.S. Pat. No. 4,580,127, filed Mar. 28, 1983 and entitled CIRCUIT FOR CONVERTING ANALOG BIPOLAR SIGNALS TO DIGITAL SIGNALS.

There exists, therefore, a need for a system for measuring the downtime of an engine without available power and supplying such information to an engine life monitor circuit when the instrumentation and the aircraft power is re-energized. Thus it is desirable to provide an interval timer which provides timing information independently of the aircraft's power system when power is unavailable and which information can be sampled once power is again restored.

SUMMARY OF THE PRESENT INVENTION

The system of the present invention provides a calibrated, highly accurate system for measuring downtime by providing a reference voltage coupled to the aircraft power supply system and a precise RC timer circuit which is selectively decoupled from the reference voltage upon engine shutdown to provide a DC voltage output signal directly dependent on the time the engine is shut down irrespective of the availability of operating power for the aircraft instruments. In a preferred embodiment of the invention, the electrical circuit of the invention is calibrated during initialization of a microprocessor coupled to the circuit to store voltage output vrs. time information which is digitized and stored in a lookup table to subsequently be employed for providing downtime information for an engine life monitor upon subsequent engine shutdown and restart. Also in one embodiment of the invention, the circuit elements are mounted to a printed circuit board which incorporates a conductive guard path surrounding intercoupling terminals for the RC timing network to provide a predictable current leakage path to improve the accuracy of the system.

Electrical systems embodying the present invention include a reference voltage source and means for selectively coupling the voltage source to an RC circuit which includes a capacitor charged by the reference voltage source during the application of power to the circuit. Upon disconnection of the power applied to the RC circuit, the voltage on the capacitor decreases in a predictable manner such that the voltage can be subsequently measured to provide downtime information which can be used for engine life fatigue analyzer or the like.

In the preferred embodiment of the invention, the RC circuit is a parallel circuit, and associated intercoupling circuit elements are placed on a circuit board including a ground potential guard band surrounding leakage sensitive terminals. This improves the predictability and repeatability of the voltage information from the circuit and, therefore, its accuracy.

These and other features, objects and advantages of the present invention will become apparent upon the reading of the following description thereof together with reference to the accompanying drawings in which:

BRIEF DESCRIPTION OF THE DRAWINGS

FIG. 1 is an electrical circuit diagram in schematic form of the circuit embodying the present invention;

FIG. 2 is a top plan view of an electrical printed circuit board incorporating the electrical circuit of the present invention;

FIG. 3 is a bottom plan view of the printed circuit board shown in FIG. 2; and FIG. 4 is a voltage waveform diagram of the time-dependent voltage provided by the circuit shown in FIGS. 1–3.

DETAILED DESCRIPTION OF THE PREFERRED EMBODIMENT

Referring initially to FIG. 1, there is shown a portion of an engine life monitor circuit 10 incorporating an electrical circuit 20 embodying the present invention. The engine life monitor 10 typically will include a microprocessor 12 as its primary data handling and control and which is coupled through suitable display drivers or the like in a conventional manner to a display 14. The display can be any of a variety of displays such as electro-mechanical counters, LCD display, or the like. The engine life monitor 10 itself is disclosed in greater detail in the above-identified U.S. Pat. No. 4,580,127, the disclosure of which is incorporated herein by reference.

The microprocessor 12 receives inputs from a variety of sources including, for example, an A to D converter 16 having at least one input coupled to a multiplexer circuit 18 through a sample and hold circuit 17. The multiplexer may include a variety of signal inputs, 19, 21', 23 and 25 shown as examples, with input terminals 23 and 27 being relevant with respect to the system of the present invention. As is well known, the microprocessor 12 will provide control and timing signals to the multiplexer 18 and associated interface circuits through a multiconductor buss 22 for controlling the handling of data including selecting which of the inputs 19–27 of the multiplexer 18 are coupled to the A to D converter 16 and subsequently to the microprocessor signal input terminal 13. In the preferred embodiment of the invention, the microprocessor employed in the engine life monitor circuit was a Motorola 68008 microprocessor. The A to D converter was a type AD 574A, the sample and hold circuit 17 a type AD 532, and the multiplexer a type 7501 interconnected in a conventional manner to provide data timing and control signals between the individual circuits including receiving information from the interval timer circuit 20 of the present invention.

The interval timer circuit 20 of the present invention includes a reference voltage source 30, which includes a voltage regulator circuit 32, type AD 531, having an input terminal 33 coupled to the typically 12 volt, direct current engine monitor supply voltage, indicated as +V in FIG. 1, and a ground terminal 34 coupled to the system ground 35. A bypass capacitor 36 is coupled between terminals 33 and 34. The voltage regulator 32 provides a regulated output voltage at output terminal 37 thereof which, in the preferred embodiment for a +V supply of 12 volts, was +10 volts DC. The output terminal 37 is also coupled to an input terminal 23 of the multiplexer 18.

Output terminal 37 is coupled to a resistive voltage divider network comprising resistors 40 and 42 having a value in the preferred embodiment of 4.22 kilo-ohms and 10 kilo-ohms respectively to provide a voltage at their junction and also to input terminal 21 of an electrical printed circuit board package 50 of +7.03 volts DC. The outer dashed lines in FIG. 1 indicate the circuit board 50, shown in FIGS. 2 and 3, while the inner phantom lines 52, in the schematic diagram of FIG. 1, illustrate the guard band circuit also shown in FIGS. 2 and 3.

Coupled to terminal 21 is an electrically controlled solid-state switch 44 having an input terminal 41 coupled to terminal 21 and an output terminal 46 coupled to system ground 35. A control input terminal 45 is coupled to an output terminal 15 of microprocessor 12 which provides a signal to switch 44 for selectively opening and closing the single-pole, single-throw equivalent switch 44 as will be described below in connection with the operation of the system. With the switch closed, terminal 21 will be pulled down to ground potential while, with switch 44 open, terminal 21 will be at +7.03 volts DC. Thus, the input terminal 21 selectively provides +7.03 volts DC to the parallel RC network comprising capacitor 60 and resistor 70. Capacitor 60, in the preferred embodiment of the invention, was a 10 microfarad ±5 percent, 50 volt capacitor, while resistor 70 was a 200 mega-ohm resistor having 1 percent tolerance. An isolation diode 54 has its anode coupled to input terminal 21 and its cathode coupled to the junction of capacitor 60 and resistor 70 which have their remote terminals intercoupled and coupled to system ground 35. The junction of the cathode of diode 54, with capacitor 60 and resistor 70, is coupled to input terminal 3 of a high input impedance operational amplifier 80, having its remaining terminals intercoupled as shown. Amplifier 80 can be an RCA type CA3130T for example. Coupled to the operational amplifier, as shown in FIG. 1, is a compensation capacitor 82 and a bypass capacitor 84. The output terminal 90 of circuit board 50 is coupled to the output terminal 6 of operational amplifier 80 and to input terminal 27 of the multiplexer 18.

In order to assure that any discharge leakage of capacitor 60 to any other terminals other than through resistor 70 to ground is predictable, a grounded, conductive guard band 52 surrounds the leakage-sensitive terminals 61 and 65, interconnected by printed circuit conductor 63 (FIG. 3). The guard band 52 is shown schematically in FIG. 1 as a cylinder surrounding the leakage-sensitive terminal 61 and 65 of capacitor 60 and resistor 70 respectively, which cylinder is coupled to ground by schematically representative conductor 66. The guard path 52, as best seen in FIGS. 2 and 3, is directly formed on the first and second surfaces, 103 and 104 respectively, of a printed circuit board base 100, typically of a fiberglass resin compound. The guard band thus is a substantially identically shaped conductor formed on opposite surfaces of board 100 and includes relatively large rectangular areas 101 and 101' occupying approximately one-third of each surface of board 100. The guard band includes enclosing conductive loops 102 and 102' which surround terminals 61 and 65 and interconnecting conductor 63 as well as conductor 64 (FIG. 3) leading to diode 54 and amplifier 80. Thus, the leakage-sensitive terminals and printed circuit conductors to the diode and to pin 3 of the operational amplifier 80 are surrounded by the conductive path comprising ground planes 101 and 101' and the conductive paths 102 and 102' physically and electrically surrounding these circuit elements, thereby presenting a constant ground potential as the physically nearest point to the leakage-sensitive terminals. Thus, if any leakage does occur due to high humidity or the like, the leakage factor will be predictable inasmuch as the ground voltage is stable, and the leakage factor will be essentially the same during both power on and power off conditions. The leakage current is thus predictable and reproducible for given conditions and can be compensated for during the calibration of the system as described below. The resistor 70 and capacitor 60 are aligned in generally parallel relationship such that their common ground terminals are coupled to the relatively large rectangular areas 101 and 101' of the circuit board guard band while their remote terminals are surrounded by the guard band conductors 102 and 102' on both sides of circuit board 100. A ground terminal 35 extends through board 100 and is coupled to areas 101 and 101' to couple the guard band to ground. Circuit 20 on board 50 is coupled to circuit 10 of FIG. 1 through the four board-mounted terminals +V, 21, 35, and 90 (FIG. 2) shown schematically also in FIG. 1.

OPERATION

During normal power-on operation of the engine life monitor circuit 10, power will be applied to the entire system and switch 44 will be in its open position as illustrated. Thus, at this time ($t_o$ in FIG. 4) capacitor 60 will be charged through diode 54 to +7.03 volts DC and held at that voltage level. Once the engine is shut down and/or power is disconnected, the microprocessor will no longer provide a signal at terminal 15 to activate switch 44 to its open position, and the switch will close thereby positioning the anode of diode 54 at ground level to render the diode non-conductive to effectively isolate the previously charged capacitor 60 from the reference voltage source 30. At this time, power is disconnected from circuit 20, and capacitor 60 can then only discharge through resistor 70 as indicated in the current path indicated by arrow A in FIG. 1 to a voltage and in a manner shown in FIG. 4. The voltage across capacitor 60, shown by the waveform of FIG. 4 will gradually decay exponentially with time and is applied to input terminal 3 of the operational amplifier 80. The voltage thus will be available for subsequent sampling by the microprocessor through isolation amplifier 80, the multiplexer 18, sample and hold circuit 17 and A to D converter 16 when power is restored. The time constant of the RC circuit is selected to be relatively long and of at least 1,000 seconds. In the preferred embodiment employed for an engine life monitor, the parameter values for capacitor 60 and resistor 70 provides a time constant of 2,000 seconds which provides a relatively slowly decaying exponential voltage curve, as shown in FIG. 4, for at least up to 30 minutes. Typically, engine downtime beyond this time period can be assigned a predetermined weighting factor in terms of engine life monitors, and of most interest is the time between initial shutdown and the cooling process which typically will take up to 30 minutes. Thus, the circuit 20 in the preferred embodiment and in this particular application is specifically designed to provide information most relevant for jet aircraft engine and downtime information of about up to an hour or so as a maximum.

In order to calibrate the system, during initialization, for example, of the microprocessor, the software control of the microprocessor will first sample the voltage at node 65 to determine the downtime of the engine and utilize such information and its engine life monitoring algorithm as described in the above-identified co-pending patent application. Once the data has been retrieved, the circuit 20 is cycled through a calibration cycle by a signal from the microprocessor momentarily opening switch 44 to charge capacitor 60 to the +7.03 volts DC, which is a relatively short period inasmuch as the charging path includes only resistor 40 and diode 54 which will be forward biased. The switch 44 is then closed by a signal from the microprocessor, effectively isolating capacitor 60 from the power supply 30 thereby allowing the capacitor to discharge through resistor 70 with the microprocessor sampling the voltage at a sampling rate sufficient to provide the representative voltage curve shown in FIG. 4. Naturally, the analog voltage shown in FIG. 4 is converted into a digital format through A to D converter 16, and the microprocessor will store for each incremental voltage and time elapsed sampled, a digital number representative of the detected voltage. Subsequently, the switch 44 is again opened during aircraft use, and the calibration curve for the circuit 20 is stored in memory for subsequent comparison and readout. Thus the microprocessor will, upon initialization, provide a perhaps new set of numbers for each cycle of operation of the engine life monitor 10 which provides more accurate information inasmuch as the component aging will be compensated for as well as individual components themselves which may vary from circuit to circuit. Calibration may also include sampling the reference voltage at 37 by microprocessor 12, through multiplexer 18, terminal 23, sample and hold 17, and A/D 16.

Thus, the system of the present invention allows repeated recalibration upon initialization of the microprocessor sequence and provides an extremely precise interval timer which is power independent and provides a signal which can be used, as in the preferred embodiment, with an engine life monitor.

It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A circuit for use in providing a time-related output voltage which is used for determining the downtime of an aircraft engine, said circuit comprising:

a reference voltage source which provides an output voltage when the aircraft engine is operational;

a charge storage device;

a conductive element coupled to said charge storage device for discharging said charge storage device at a precise predetermined relatively slow rate; and means for coupling said reference voltage source to said charge storage device such that said charge storage device will be charged to a predetermined voltage when the aircraft engine is shut down and said charged voltage will reduce from said predetermined voltage with shutdown time of the engine in a predictable manner and means for measuring the reduced voltage across said charge storage device upon engine restarting to determine the engine downtime.

2. The circuit as defined in claim 1 wherein said charge storage device comprises a capacitor.

3. The circuit as defined in claim 2 wherein said conductive element comprises a resistor.

4. The circuit as defined in claim 3 wherein the values of said capacitor and said resistor are selected to provide an RC time constant of at least about 1,000 seconds.

5. The circuit as defined in claim 4 wherein said reference voltage source provides a direct output voltage having a predetermined level.

6. The circuit as defined in claim 5 wherein said means for coupling said reference voltage source to said charge storage device includes a controlled solid-state switch.

7. The circuit as defined in claim 6 wherein said means for coupling said reference voltage source to said charge storage device further comprises two series coupled resistors, said series resistors coupled between said reference voltage source to ground, and a unidirectional conductive device coupled from the junction of said series resistors to said capacitor and wherein said controlled solid-state switch has one switch terminal coupled to said junction and another switch terminal coupled to ground such that when said switch is actuated to couple said one and another terminals, the voltage at said junction is at ground potential to effectively disconnect said capacitor from said reference voltage source.

8. The circuit as defined in claim 7 wherein said solid-state switch has a control input terminal for receiving a signal from an aircraft electrical engine monitor circuit to actuate said switch upon engine shutdown.

9. An interval timer for use in providing a time-related output voltage used for determining the downtime of an aircraft engine, said interval timer comprising:

a direct current reference voltage source;

a capacitor and resistor coupled in parallel relationship to each other, said capacitor and said resistor having values for providing a relatively high RC time constant;

means for selectively coupling said reference voltage source to said capacitor such that said capacitor will have charged to a predetermined voltage when the aircraft engine is shut down and said charged voltage will reduce from said predtermined voltage with shutdown time of the engine in a predictable manner allowing the voltage to be subsequently measured to determine the engine downtime; and means coupled to said capacitor for monitoring the voltage across said capacitor to determine the downtime of the engine as represented by the reduced voltage across said capacitor upon restarting of the engine.

10. The interval timer as defined in claim 9 wherein the values of said capacitor and said resistor are selected to provide an RC time constant of at least about 1,000 seconds.

11. The interval timer as defined in claim 10 wherein said means for selectively coupling said reference voltage source to said capacitor includes a controlled solid-state switch.

12. The interval timer as defined in claim 11 wherein said means for selectively coupling said reference voltage source to said capacitor further comprises two series coupled resistors, said series resistors coupled between said reference voltage source to ground, and a unidirectional conductive device coupled from the junction of said series resistors to said capacitor.

13. The interval timer as defined in claim 12 wherein said controlled solid-state switch has one switch terminal coupled to said junction and another switch terminal coupled to ground such that when said switch is actuated to couple said one and another terminals, the voltage at said junction is at ground potential to effectively disconnect said capacitor from said reference voltage source.

14. The interval timer as defined in claim 13 wherein said solid state-switch has a control input terminal for receiving a signal from an aircraft electrical engine monitor circuit to actuate said switch upon engine shutdown.

15. The interval timer as defined in claim 14 wherein said monitoring means includes a high input impedance DC amplifier.

16. The interval timer as defined in claim 15 and further including a microprocessor coupled to said control input terminal of said solid-state switch and to said amplifier for providing control signals thereto and for determining the engine downtime as a function of the measured voltage across said capacitor.

17. An interval timer for use in providing a time-related output voltage used for determining the downtime of an aircraft engine, said interval timer comprising:

a reference voltage source for providing an output voltage of a predetermined level;

a circuit board having first and second surfaces;

a capacitor and resistor mounted to said first surface of said circuit board, said circuit board including conductors formed thereon for coupling said capacitor and resistor in parallel relationship to each other wherein said capacitor and resistor have values for providing a relatively high RC time constant;

means for selectively coupling said reference voltage source to said capacitor such that said capacitor will have charged to said predetermined voltage level when the aircraft engine is shut down and the voltage across said capacitor will reduce from said predetermined voltage level with shutdown time of the engine in a predictable manner and means for measuring the reduced voltage across said capacitor upon engine start-up to determine the engine downtime; and wherein said capacitor and resistor have a first junction coupled to a ground conductor formed on said second surface of said circuit board and a second junction coupled to said reference voltage source and said circuit board includes a conductive element formed on said second surface thereon and circumscribing said second junction, said conductive element coupled to said ground conductor to define a guard path to control leakage current from said capacitor in a predictable manner.

18. The interval timer as defined in claim 17 wherein said circuit board further includes a second conductive element formed on said first surface and having a shape substantially the same as said first conductive element and coupled to said ground conductor whereby said guard path is defined by said first and second conductive elements on opposite sides of said circuit board.

19. The interval timer as defined in claim 18 wherein the values of said capacitor and said resistor are selected to provide an RC time constant of at least about 1,000 seconds.

20. The interval timer as defined in claim 19 wherein said means for selectively coupling said reference voltage source to said capacitor includes a controlled solid-state switch.

* * * * *